(12) United States Patent
Cleveland et al.

(10) Patent No.: US 10,865,901 B2
(45) Date of Patent: Dec. 15, 2020

(54) ALL-METAL PRESSURE RELIEF VALVE

(71) Applicant: BAE SYSTEMS Information and Electronic Systems Integration Inc., Nashua, NH (US)

(72) Inventors: Kenneth D. Cleveland, Hollis, NH (US); Joseph A. Colosimo, Lexington, NH (US); Michael J. Patrick, Andover, MA (US); John A. Talbourdet, Danvers, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/185,868

(22) Filed: Nov. 9, 2018

(65) Prior Publication Data

US 2020/0149646 A1    May 14, 2020

(51) Int. Cl.
| | | |
|---|---|---|
| *F16K 17/04* | (2006.01) | |
| *F16K 17/08* | (2006.01) | |
| *F16K 15/14* | (2006.01) | |

(52) U.S. Cl.
CPC .......... *F16K 17/0413* (2013.01); *F16K 17/08* (2013.01); *F16K 15/147* (2013.01); *F16K 17/0426* (2013.01)

(58) Field of Classification Search
CPC ................. F16K 17/0143; F16K 17/08; Y10T 137/6086; Y10T 137/7925
See application file for complete search history.

(56) References Cited

U.S. PATENT DOCUMENTS

| | | | | |
|---|---|---|---|---|
| 2,223,994 A | * | 12/1940 | Johnson | F16K 15/028 137/543.21 |
| 3,048,188 A | * | 8/1962 | Hunter | F16K 17/08 137/469 |
| 5,092,361 A | * | 3/1992 | Masuyama | F16K 15/026 137/543.21 |
| 6,089,262 A | * | 7/2000 | Hart | B60T 11/326 137/543.19 |
| 6,116,573 A | * | 9/2000 | Cornette | F16K 41/02 251/214 |
| 6,308,739 B1 | * | 10/2001 | Barbuto | F16K 5/0478 137/625.11 |

(Continued)

*Primary Examiner* — Kevin R Barss
(74) *Attorney, Agent, or Firm* — Maine Cernota & Rardin; Scott J. Asmus (57) ABSTRACT

A pressure relief valve having two rigid sealing surfaces lapped to a smoothness Ra of 8 micro-inches or less, and flatness within 80 micro-inches, forms a reliable seal by direct contact therebetween without an elastomer. The sealing surfaces and surrounding structures can be made of one or more metals, such as alloys of stainless steel, and can be CTE-matched, so that the valve is not impeded by environmental temperature changes. In a disclosed embodiment, a "poppet" is axially pressed against a seal plate by a spring. The poppet can be axially stabilized by sliding within a surrounding cylinder or spacer, and can contact the surrounding surface with a plurality of "arms" that reduce friction and enable gas flow therebetween. The poppet can be made from anti-galling Nitronic 60 alloy, and the surrounding structures can be stainless steel. Embodiments are suitable for low-pressure gas applications in extreme environments.

25 Claims, 10 Drawing Sheets

(56) References Cited

U.S. PATENT DOCUMENTS

| | | | |
|---|---|---|---|
| 6,651,696 B2* | 11/2003 | Hope | F16K 17/046 137/469 |
| 7,513,270 B2* | 4/2009 | Martin | F16K 17/0426 137/469 |
| 2014/0202556 A1* | 7/2014 | Do Van | B60P 7/065 137/223 |
| 2015/0108385 A1* | 4/2015 | Rankin | F16K 3/0209 251/314 |
| 2016/0327171 A1* | 11/2016 | Seidl | F16K 17/04 |
| 2017/0152958 A1* | 6/2017 | Akamatsu | F16K 1/36 |

* cited by examiner

ALL-METAL PRESSURE RELIEF VALVE

STATEMENT OF GOVERNMENT INTEREST

This invention was made with government support under Missile Defense Agency Prime Contract No. HQ0147-17-C-0032. The United States Government has certain rights in the inventions.

FIELD

The present disclosure relates to pressure relief valves, and more particularly to pressure relief valves that are required to function for long periods in harsh environments without maintenance.

BACKGROUND

Pressure relief valves are commonly employed to provide safety and pressure regulation for enclosed volumes that are subject to internal pressure fluctuations. Generally speaking, a pressure relief valve is required to prevent exchange of fluids between the enclosed volume and the external environment so long as the internal pressure does not exceed the external pressure by more than a specified "cracking" pressure. When the internal pressure difference rises above the specified cracking pressure, the pressure relief valve is required to open so as to allow internal fluid to escape, thereby preventing the internal pressure from rising above the specified cracking pressure.

In some applications, it can be typical for a pressure relief valve to remain closed for long periods of time before being required to open and vent internal pressure. In other applications, it can be typical for a pressure relief valve to open and close frequently. Nevertheless, a pressure relief valve is typically required to maintain its functionality over long periods of time, so that it can be relied upon to open whenever the specified cracking pressure is reached.

Pressure relief valves generally employ a pair of sealing surfaces that are brought into contact with each other when the valve is closed, and are separated from each other when the valve is opened. A spring or similar mechanism is often employed to maintain the sealing surfaces in contact with each other, whereby the force applied to the sealing surfaces by the spring determines the cracking pressure at which the valve will open. One of the sealing surfaces is typically mobile, and is held in position by the spring, while the other sealing surface is typically fixed in position. The movement of the mobile sealing surface is often guided by a valve "stem" or similar structure, which slides within a valve stem sleeve or against some other fixed structure.

Rigid surfaces generally include some roughness, and over time, as rigid surfaces are brought into repeated contact with each other, wear of the surfaces can occur and can increase their roughness. In addition, rigid surfaces may not be perfectly flat. As a result, it is typical for leakage to occur between rigid surfaces that are pressed together, especially after repeated contacts.

For this reason, most pressure relief valves, especially gas pressure relief valves, employ an elastomeric sealing surface, such as an elastomeric disk or gasket, which compensates for the surface roughness and lack of perfect flatness of the associated rigid components of the valve. However, elastomeric materials can degrade over time, especially when they are exposed to harsh environments such as extremes in pressure and/or damaging chemical. Elastomeric components can also physically "set" over time, whereby they become partially rigid, or become overly soft such that they leak and/or adhere to other surfaces.

When a pressure relief valve is required to open frequently, friction and galling between the valve stem and valve stem sleeve, or between other sliding components, can lead to wear and degradation. Mechanical degradation can also occur due to excessive vibrations, especially if the valve is complex in design. These mechanical degradations can lead to failure of the pressure relief valve. For example, as a valve stem becomes "loose" within its sleeve, the associated mobile sealing surface may no longer align properly with the corresponding fixed sealing surface, and the valve may no longer seal properly.

Accordingly, pressure relief valves tend to fail over time, especially if they are subjected to harsh environments and vibrations, unless they are periodically serviced or replaced. Unfortunately, however, it is not always possible to provide periodic maintenance or replacement of pressure relief valves, due to the harsh conditions in which they are deployed and/or due to physical remoteness of the valve. For example, a valve that is deployed in space is generally subjected to harsh conditions, and yet is required to function reliably for long periods of time without maintenance.

What is needed, therefore, is a pressure relief valve that can operate reliably in harsh environments for long periods of time without requiring maintenance or replacement of the valve.

SUMMARY

The present disclosure is a pressure relief valve that can operate reliably for long periods of time in harsh environments, including environments that are subject to significant vibrations and temperature fluctuations, without requiring periodic maintenance or replacement. The disclosed valve features a simple design wherein a seal is formed by direct contact between two rigid sealing surfaces that have been lapped or otherwise shaped to a high degree of smoothness (in embodiments Ra equals 8 micro-inches or less, preferably 4 micro-inches or less) and flatness (in embodiments within 80 micro-inches or less, preferably 40 micro-inches or less), so that a reliable seal is formed by direct contact between the rigid sealing surfaces, without use of an elastomer. One of the sealing surfaces is a "fixed" sealing surface formed in a fixed location, while the other, opposing sealing surface is a "mobile" sealing surface formed on a mobile member that can move toward and away from the fixed sealing surface so as to close and open the valve.

In embodiments, the fixed sealing surface is formed on a seal plate, and in some of these embodiments the seal plate, mobile member, and surrounding structures are made of one or more metals, such as alloys of stainless steel. In some embodiments the sealing surfaces and surrounding structures have matched coefficients of thermal expansion (CTE-matched), so that the mechanical operation of the valve is not impeded by temperature changes in the environment.

In various embodiments, the mobile member is a "poppet" that slides axially within a surrounding cylinder or spacer. This approach helps to stabilize and center the mobile sealing surface relative to the fixed sealing surface, as compared to designs that support and orient the mobile sealing surface using a central stem and sleeve. In some of these embodiments, the poppet includes a plurality of surrounding "tabs" or "arms" having distal surfaces that contact the surrounding cylinder or spacer, thereby reducing friction between the poppet and surrounding cylinder or sleeve, and enabling gas to flow between the arms when the valve is open. The distal surfaces of the arms can have "squared" edges, or they can be rounded so as to avoid goring of the spacer, and so as to permit a small degree of tiling of the poppet, thereby allowing the mobile sealing surface to naturally align itself with the fixed sealing surface when the valve is closed. In some of these embodiments, the distal surfaces of the arms are shaped as sections of spheres.

In certain embodiments, the poppet is made from a hardened stainless steel such as Nitronic 60 alloy (Cr 17%, Mn 8%, Ni 8.5%, Si 4%, N 0.13%, C 0.10%, Fe balance) that resists galling, abrasion, and other forms of wear, and the surrounding cylinder, spacer, and/or other structures are also made from stainless steel alloys, so that the poppet and surrounding structures are CTE matched. In similar embodiments, the cylinder or spacer is made from a hardened material such as Nitronic 60, and in still other embodiments both the poppet and the spacer, cylinder, and/or other surrounding structures are made from hardened steel alloys such as Nitronic 60.

Embodiments include a spring that presses the mobile member toward the seal plate, and thereby determines the cracking pressure of the valve, such that, in embodiments, the cracking pressure can be adjusted by simply exchanging the spring.

Embodiments are suitable for low-pressure gas applications because there is very little internal friction within the disclosed valve. For example, embodiments can be implemented in missiles for precise pressure relief of internal volumes under low pressure flight conditions, as well as for providing seals against contamination from external ambient atmosphere during non-flight conditions.

A first general aspect of the present disclosure is a pressure relief valve, which includes a fluid inlet and a fluid outlet, a fixed sealing surface, the fixed sealing member being fixed in position within a housing, and a mobile member having a mobile sealing surface positioned in opposition to the fixed sealing surface, the mobile member being axially movable away from and toward the fixed sealing surface so as to alternately separate the sealing surfaces from each other and bring the sealing surfaces into mutual contact with each other. The pressure relief valve is closed and prevents passage of a fluid from the inlet to the outlet when the sealing surfaces are in mutual contact with each other, and the pressure relief valve is open and permits passage of the fluid from the inlet to the outlet when the sealing surfaces are separated from each other. The pressure relief valve is configured to open when a pressure at the inlet is higher than a pressure at the outlet by more than a specified cracking pressure.

In embodiments, each of the sealing surfaces has a roughness Ra that is not greater than 8 micro-inches, and a flatness that is within 80 micro-inches. In some embodiments, each of the sealing surfaces has a roughness Ra that is not greater than 4 micro-inches, and a flatness that is within 40 micro-inches.

In any of the above embodiments, the mobile member can be a poppet that is maintained in axial alignment with the fixed sealing surface by a surrounding sleeve. In some of these embodiments, the mobile sealing surface is an annular surface that is symmetrically surrounds a central axis of the poppet. In any of these embodiments, the poppet can comprise a plurality of arms that extend radially and have distal surfaces that slide along an inner surface of the surrounding sleeve when the mobile member moves toward and away from the fixed member, whereby the fluid is able to flow between the arms when the pressure relief valve is open. In some of these embodiments the distal surfaces of the arms have axial edges that are squared in shape, while in other of these embodiments the distal surfaces of the arms have axial edges that are curved in shape. And in some of these embodiments the distal surfaces are shaped as sections of spheres. In any of these embodiments, the surrounding sleeve can includes a shelf that sets a maximum distance of separation between the sealing surfaces. And in some of these embodiments an inner diameter of the shelf is variable about a circumference of the shelf, thereby reducing obstruction of fluid flow by the shelf when the pressure relief valve is open.

Any of the above embodiments can further include a spring configured to apply an axial force to the mobile member that tends to bring the sealing surfaces into mutual contact with each other, a tension of the spring thereby determining the cracking pressure. In some of these embodiments, the mobile member is a poppet that is maintained in axial alignment with the fixed member by a surrounding sleeve, and the spring is a coil spring that is configured to apply a force to the poppet that is symmetrically proximal to a perimeter of the poppet.

In any of the above embodiments, the fixed sealing surfaces can be formed on a seal plate. In some of these embodiments, the seal plate can be in threaded attachment to the housing, and wherein the mobile member is maintained within the housing by the seal plate. In some of these embodiments, threads of the threaded attachment are sealed by a thread sealant. In any of these embodiments, the seal plate, the mobile member, and the housing can all have substantially equal thermal coefficients of expansion. In any of these embodiments, the seal plate, the mobile member, and the housing can all be made from metal. In any of these embodiments, the seal plate, the mobile member, and the housing can all be made from stainless steel. And in some of these embodiments the mobile member is made from an alloy that substantially consists of 17% chromium, 8% manganese, 8.5% nickel, 4% sulfur, 0.13% nitrogen, 0.1% carbon, and the balance of iron.

A second general aspect of the present disclosure is a method of manufacturing a pressure relief valve that forms a seal by mutual contact between rigid sealing surfaces. The method includes providing a seal plate having a fixed sealing surface and a mobile member having a mobile sealing surface, smoothing and flattening each of the sealing surfaces, and assembling the seal plate and mobile member into a housing such that the mobile sealing surface is positioned in opposition to the fixed sealing surface, the mobile member being axially movable away from and toward the seal plate so as to alternately separate the sealing surfaces from each other and bring the sealing surfaces into mutual contact with each other. The pressure relief valve is closed and prevents passage of a fluid from the inlet to the outlet when the sealing surfaces are in mutual contact with each other, and the pressure relief valve is open and permits passage of the fluid from the inlet to the outlet when the sealing surfaces are separated from each other. The pressure relief valve is configured to open when a pressure at the inlet is higher than a pressure at the outlet by more than a specified cracking pressure.

In embodiments, smoothing and flattening each of the sealing surfaces includes smoothing and flattening each of the sealing surfaces until each of the sealing surfaces has a roughness Ra that is not greater than 8 micro-inches and a flatness that is within 80 micro-inches. In some embodiments, smoothing and flattening each of the sealing surfaces includes smoothing and flattening each of the sealing surfaces until each of the sealing surfaces has a roughness Ra that is not greater than 8 micro-inches and a flatness that is within 80 micro-inches.

In any of the above embodiments, smoothing and flattening each of the sealing surfaces can include lapping each of the sealing surfaces.

A third general aspect of the present disclosure is a pressure relief valve that includes a fluid inlet and a fluid outlet, a seal plate having a seal plate sealing surface, the seal plate being fixed in position within a housing, and a poppet having a poppet sealing surface positioned in opposition to the seal plate sealing surface, the poppet being axially movable away from and toward the seal plate so as to alternately separate the sealing surfaces from each other and bring the sealing surfaces into mutual contact with each other. The pressure relief valve is closed and prevents passage of a fluid from the inlet to the outlet when the poppet and seal plate sealing surfaces are in mutual contact with each other, and the pressure relief valve is open and permits passage of the fluid from the inlet to the outlet when the sealing surfaces are separated from each other. The pressure relief valve is configured to open when a pressure at the inlet is higher than a pressure at the outlet by more than a specified cracking pressure. The poppet, seal plate, and the housing are all made from metal. And the poppet includes a plurality of tabs that extend radially and slide along an inner surface of a surrounding surface so as to maintain the sealing surfaces in axial alignment with each other when the poppet moves toward and away from the seal plate, whereby the fluid is able to flow between the tabs when the pressure relief valve is open.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
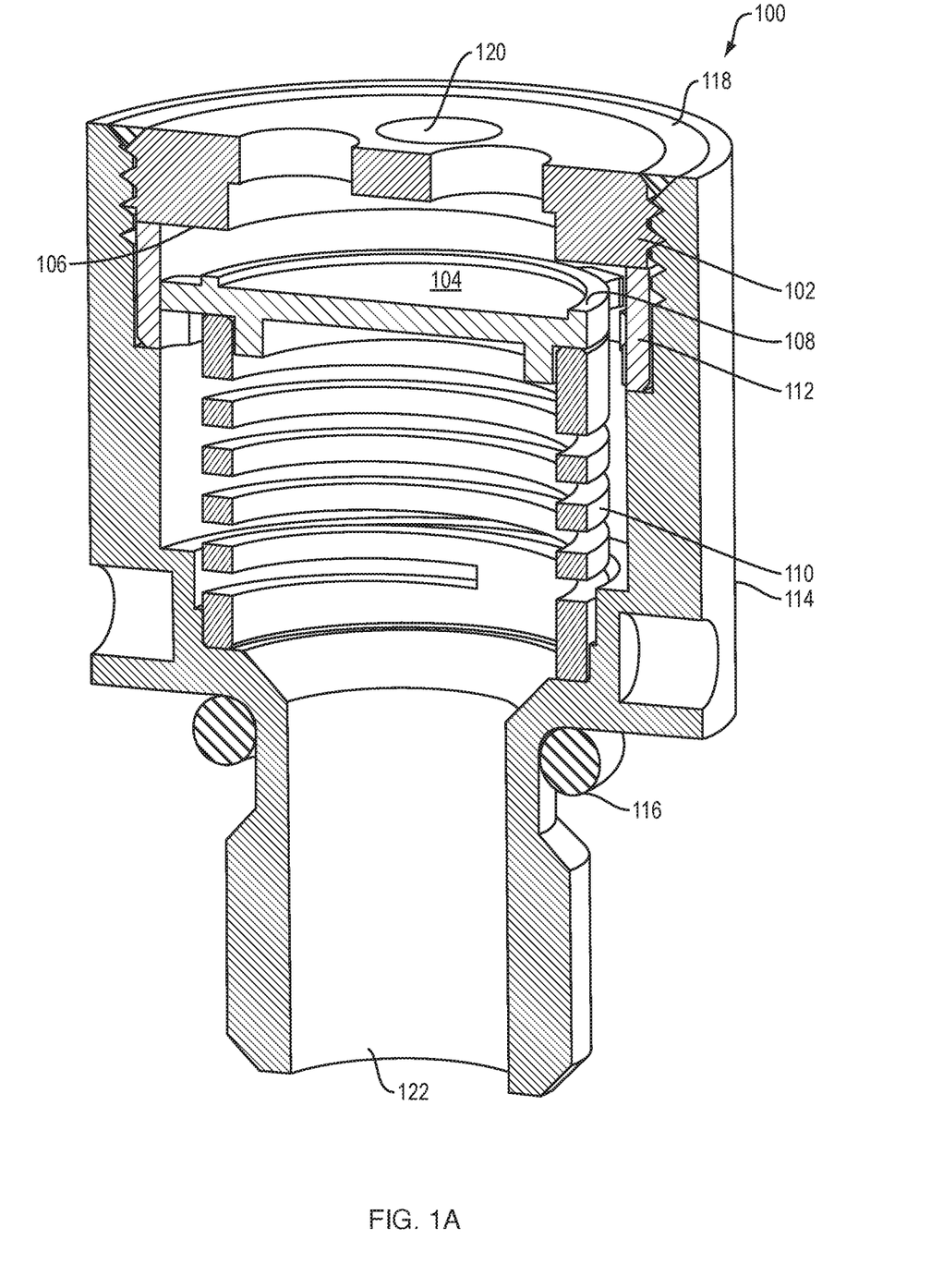
FIG. 1A is a perspective side sectional view of an embodiment of the disclosure, shown in an open configuration.
Figure 1B:
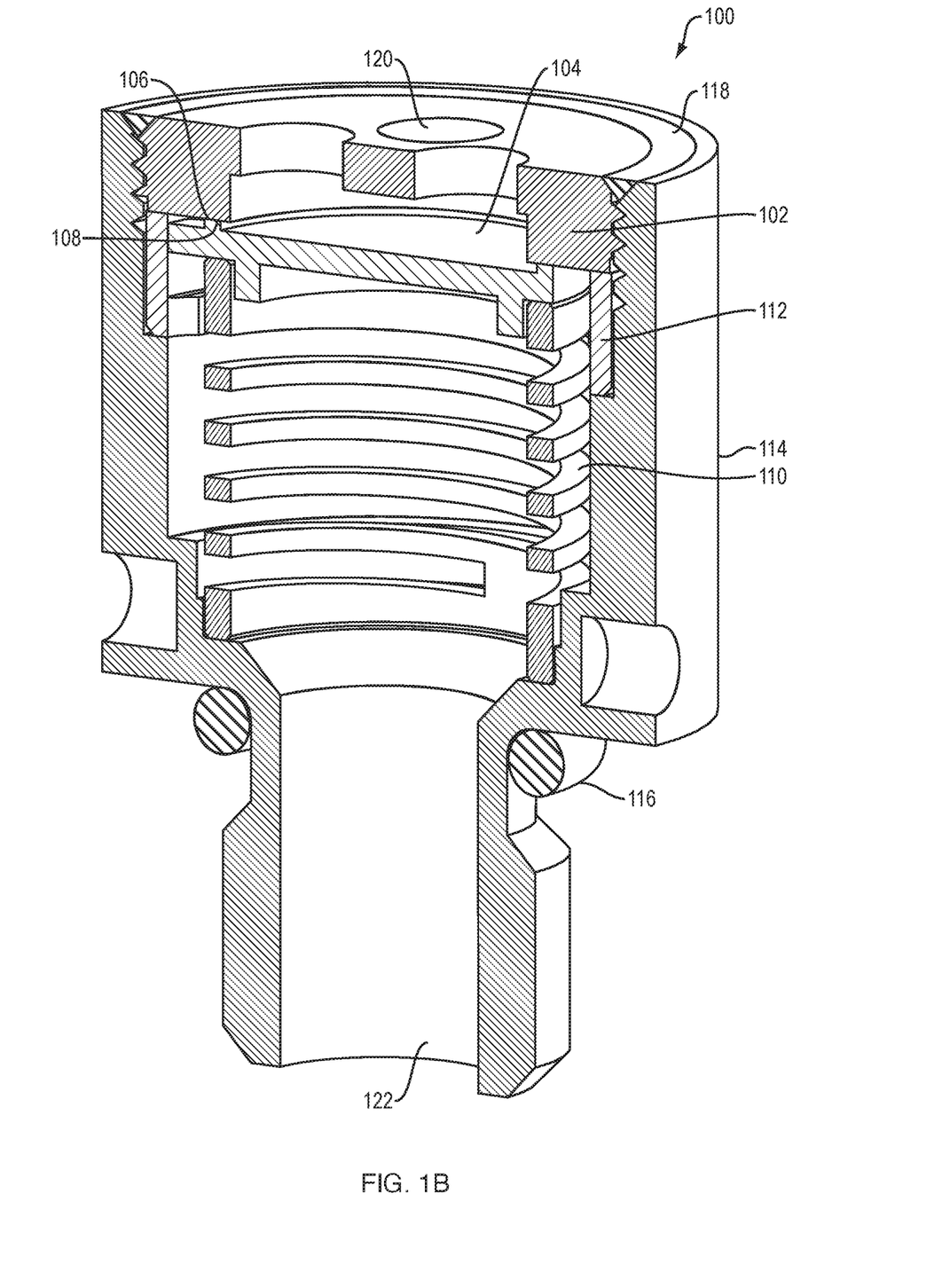
FIG. 1B is a perspective side sectional view of an embodiment of the disclosure, shown in a closed configuration.

The present disclosure is a pressure relief valve that can operate reliably for long periods of time in harsh environments, including environments that are subject to significant vibrations and temperature fluctuations, without requiring periodic maintenance or replacement. A perspective sectional view of an exemplary embodiment of the present disclosure is presented in FIGS. 1A and 1B, where FIG. 1A shows the valve 100 in an open configuration, and FIG. 1B shows the valve 100 in a closed configuration.

As is shown in the figures, the disclosed valve 100 features a simple design wherein a seal is formed by direct contact between two rigid sealing surfaces, which are a fixed sealing surface 106 formed in a fixed location, and a mobile sealing surface 108 formed on a mobile member 104 that can move toward and away from the fixed sealing surface 106 so as to close and open the valve 100. Both of the sealing surfaces 106, 108 have been lapped or otherwise shaped to a high degree of smoothness (in embodiments Ra equals 8 micro-inches or less, preferably 4 micro-inches or less) and flatness (in embodiments within 80 micro-inches or less, preferably 40 micro-inches or less), so that a reliable seal is formed by direct contact therebetween, without use of an elastomer.

In various embodiments, the fixed sealing surface 106 can be formed on any fixed structure, including a portion of a surrounding housing 114. In the embodiment of FIGS. 1A and 1B, the fixed sealing surface 106 is formed on a seal plate 102 that is threaded into an upper section of the surrounding housing 114 and is penetrated by fluid inlet holes 120. Assembly and disassembly of the embodiment is thereby simplified, in that the remaining components of the valve 100 are retained within the housing 114 by the seal plate 102. The threads in the illustrated embodiment are sealed by a thread sealant 118. A lower end of the housing 100 that surrounds the fluid outlet 122 is sealed to a surrounding structure (not shown) by an O-ring 116.

The mobile sealing surface 108 in the illustrated embodiment is formed on a "poppet" 104 that slides axially within a surrounding spacer 112. This approach helps to stabilize the orientation of the mobile sealing surface 108 relative to the fixed sealing surface 106, as compared to designs that support and orient the mobile sealing surface using a central stem and sleeve.

The illustrated embodiment includes a spring 110 that presses the poppet 104 toward the seal plate 102, and thereby determines the cracking pressure at which the valve 100 opens, such that, in embodiments, the cracking pressure can be adjusted by simply exchanging the spring.

Figure 2A:
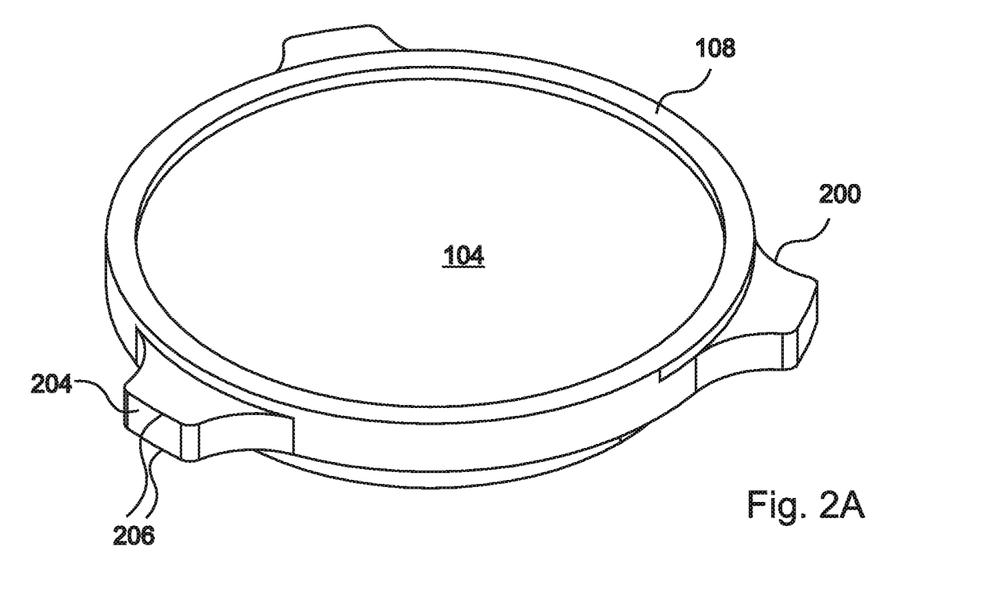
FIG. 2A is a perspective view from above of the poppet of the embodiment of FIG. 1A.
Figure 2B:
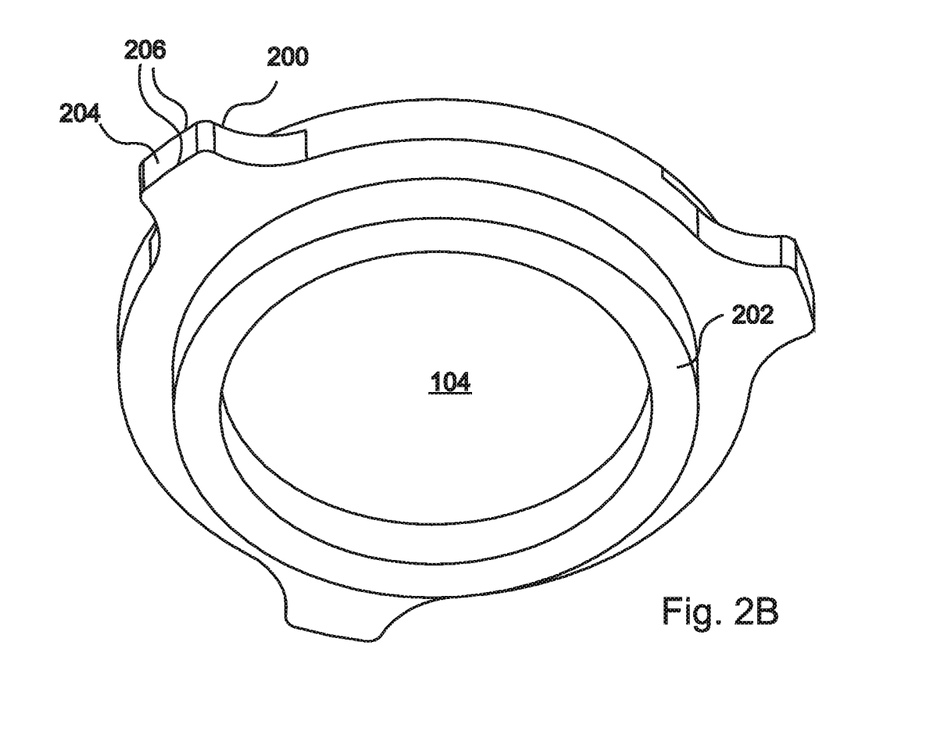
FIG. 2B is a perspective view from below of the poppet of FIG. 2A.
Figure 3:
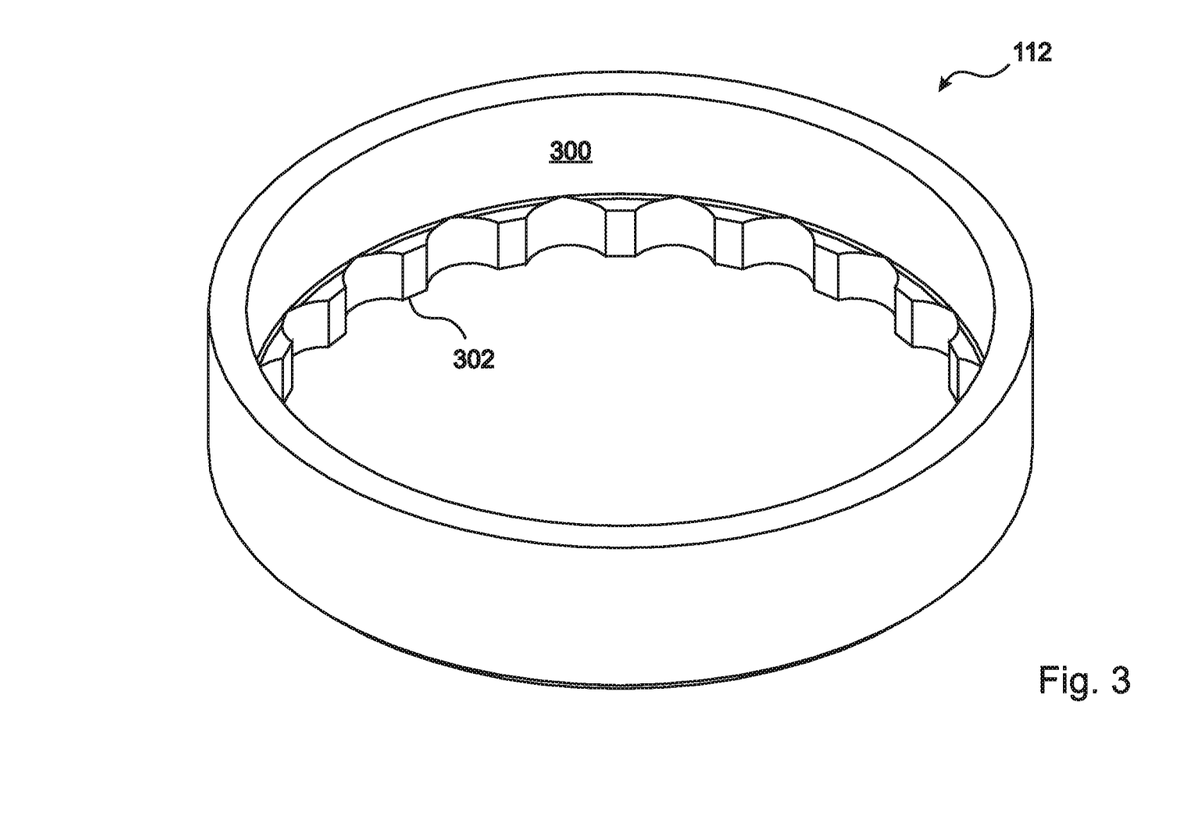
FIG. 3 is a perspective view from above of the spacer of the embodiment of FIG. 1A.

Perspective views of the poppet 104 from above and below are shown in FIGS. 2A and 2B, and a perspective view of the spacer 112 from above is shown in FIG. 3. As can be seen in the figures, the poppet 104 in the illustrated embodiment includes a plurality of surrounding "tabs" or "arms" 200 having distal surfaces 204 that contact and slide against the surrounding inner surface 300 of the spacer 112. Providing these arms 200, rather than simply making the poppet 104 larger in diameter, reduces the sliding friction between the poppet 104 and spacer 112, and enables gas to flow between the arms 200 when the valve is open. The distal surfaces 204 of the arms 200 in FIG. 3 have "squared" axial edges 206. In similar embodiments, the axial edges 206 are rounded so as to avoid goring of the inner surface 300 of the spacer 112, and so as to permit a small degree of tiling of the poppet 104, thereby allowing the mobile sealing surface 108 to naturally align itself with the fixed sealing surface 106 when the valve 100 is closed. In some of these embodiments, the distal surfaces 204 of the arms 200 are shaped as sections of spheres. The under-side of the poppet 104 includes a collar 202 that centers the spring 110 on the lower surface of the poppet 104.

Figure 4A:
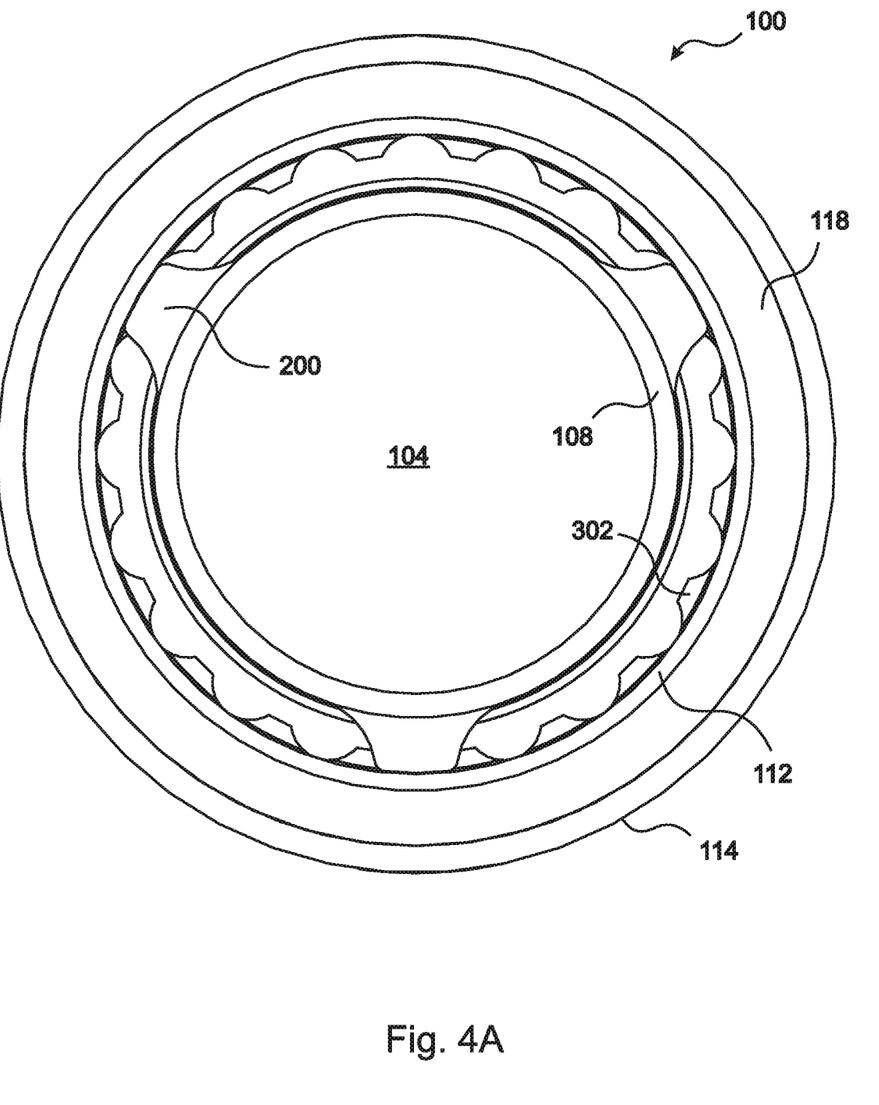
FIG. 4A is a top view showing the poppet and spacer assembled within the housing, but with the seal plate removed, according to the embodiment of FIG. 1A.

The spacer 112 further includes a flange 302 that provides a stop for the poppet 104 to limit its axial movement away from the fixed sealing surface 102. In the illustrated embodiment, the flange 302 is scalloped, so as to provide for enhanced gas flow when the valve is open. A top view of the assembled housing 114, thread sealer 118, spacer 112, and poppet 104 is shown in FIG. 4A, where the seal plate 102 has been made invisible so that the underlying components can be seen.

Figure 4B:
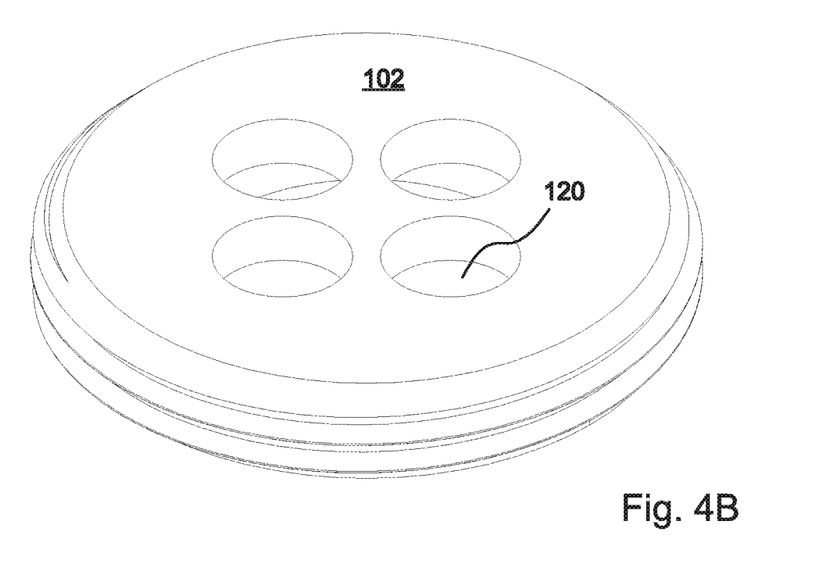
FIG. 4B is a perspective view from above of the seal plate of the embodiment of FIG. 1A.
Figure 4C:
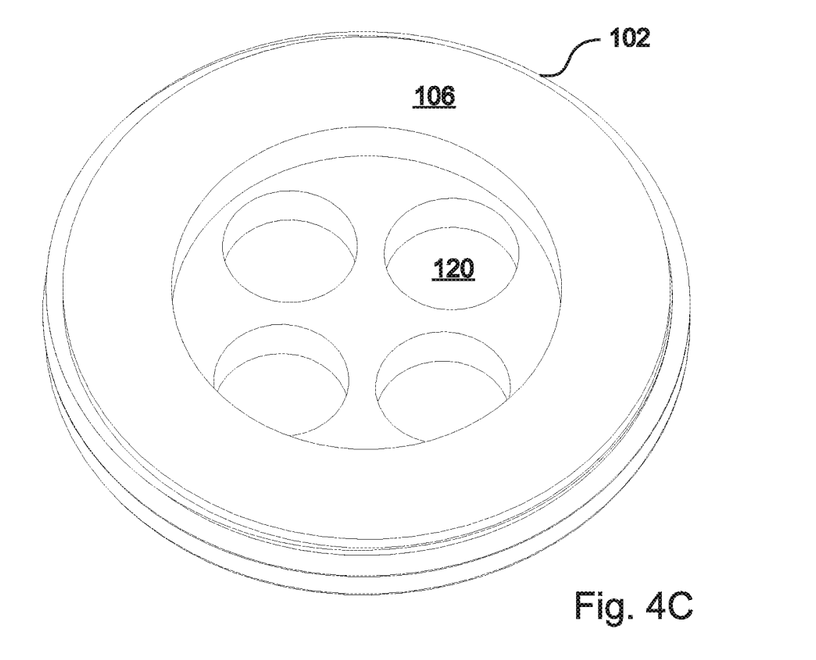
FIG. 4C is a perspective view from below of the seal plate of FIG. 4A.

FIGS. 4B and 4C are perspective views from above and from below, respectively, of the seal plate 102 of the illustrated embodiment.

Figure 5:
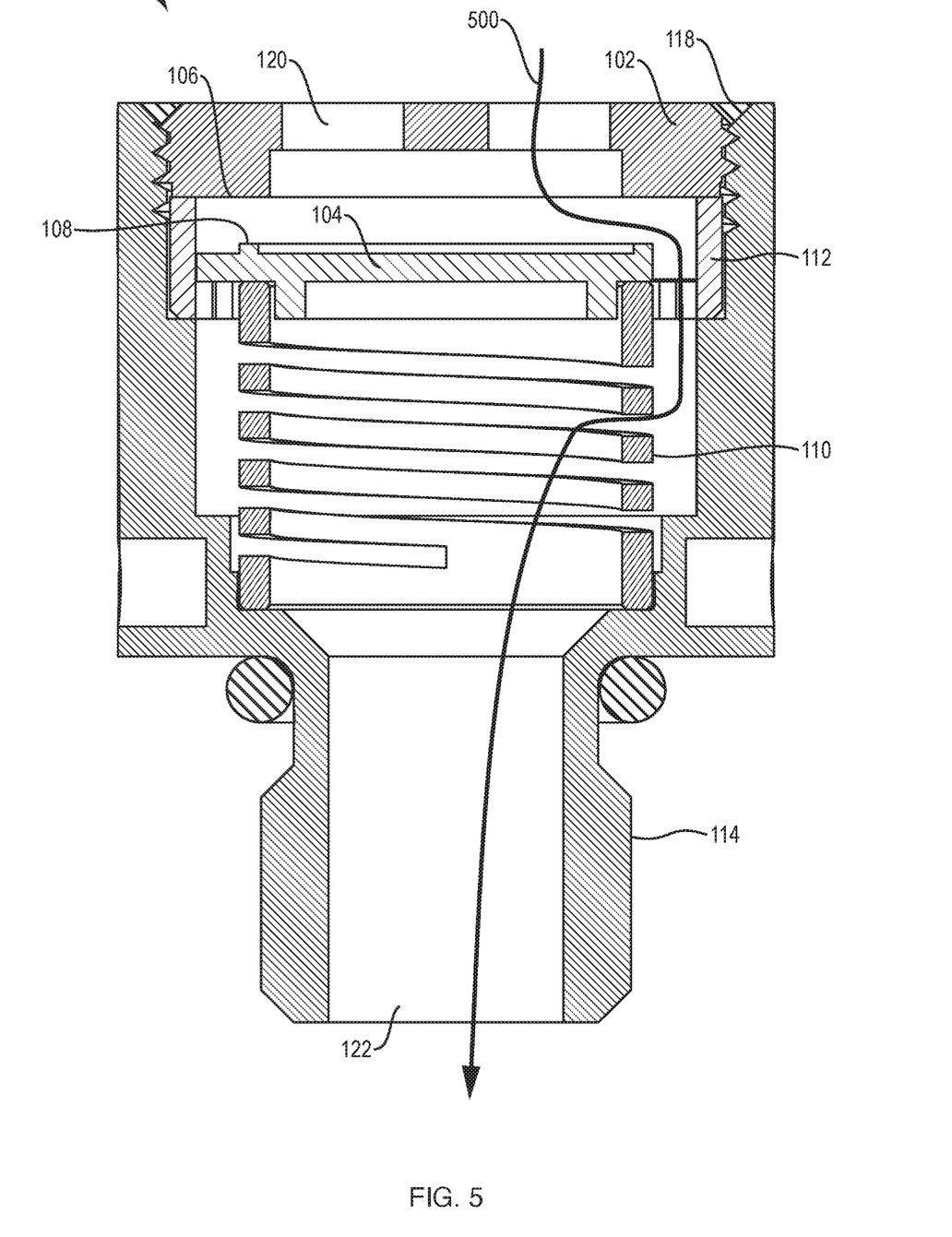
FIG. 5 is a sectional side view of the embodiment of FIG. 1A, shown in the open configuration and indicating a path through which fluid can flow from the inlet to the outlet of the pressure relief valve.
Figure 6:
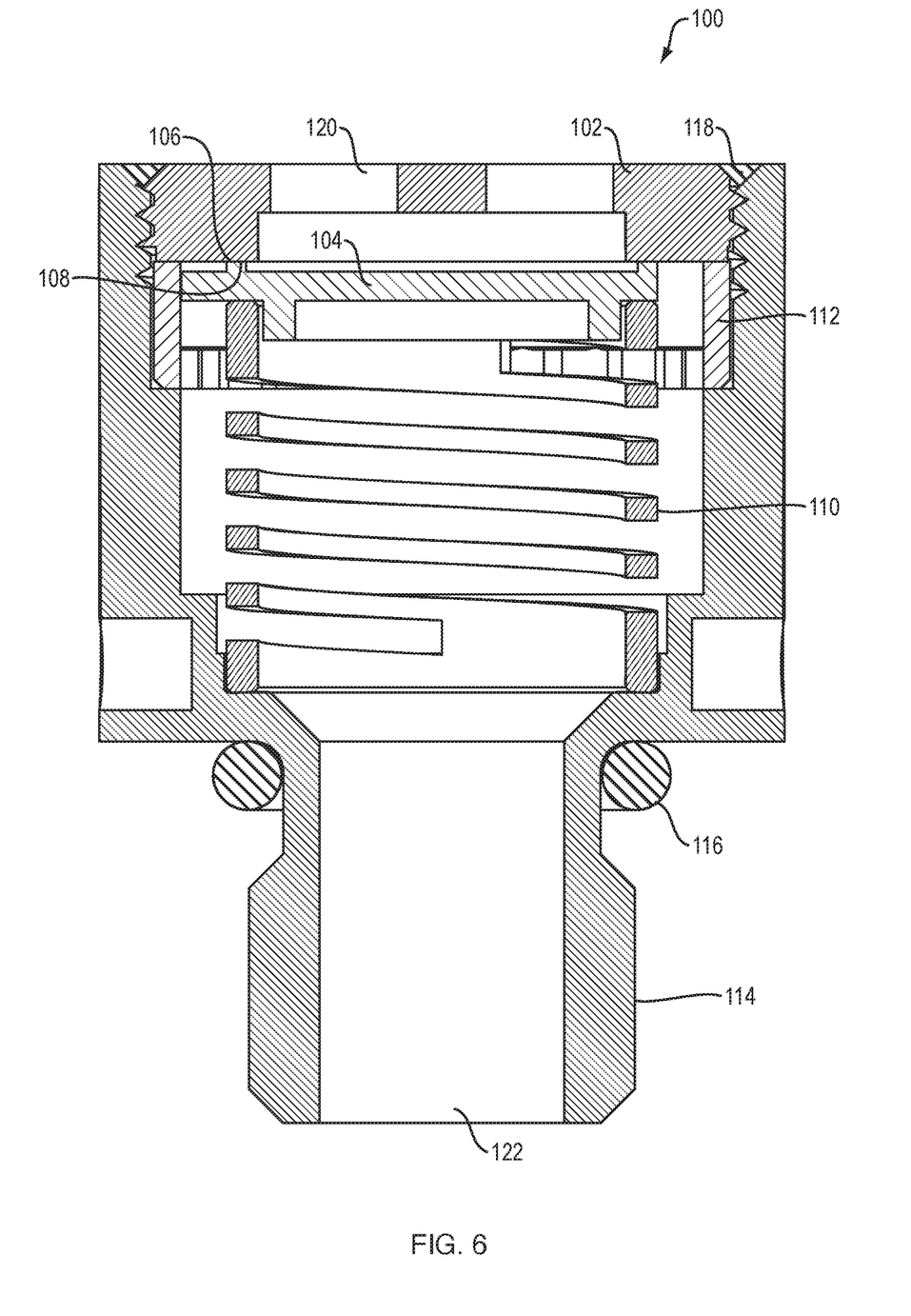
FIG. 6 is a sectional side view of the embodiment of FIG. 1B, shown in the closed configuration.

FIG. 5 is a sectional side view of the illustrated embodiment in an open configuration, showing the path 500 that a gas follows in flowing from the inlet 120 through the seal plate 102, between the separated seal faces 106, 108, between the arms 200 of the poppet 104 and the scallops 302 of the spacer 112, between windings of the spring 110, and out through the outlet 122. For comparison, FIG. 6 is a sectional side view of the illustrated embodiment in a closed configuration.

Figure 7:
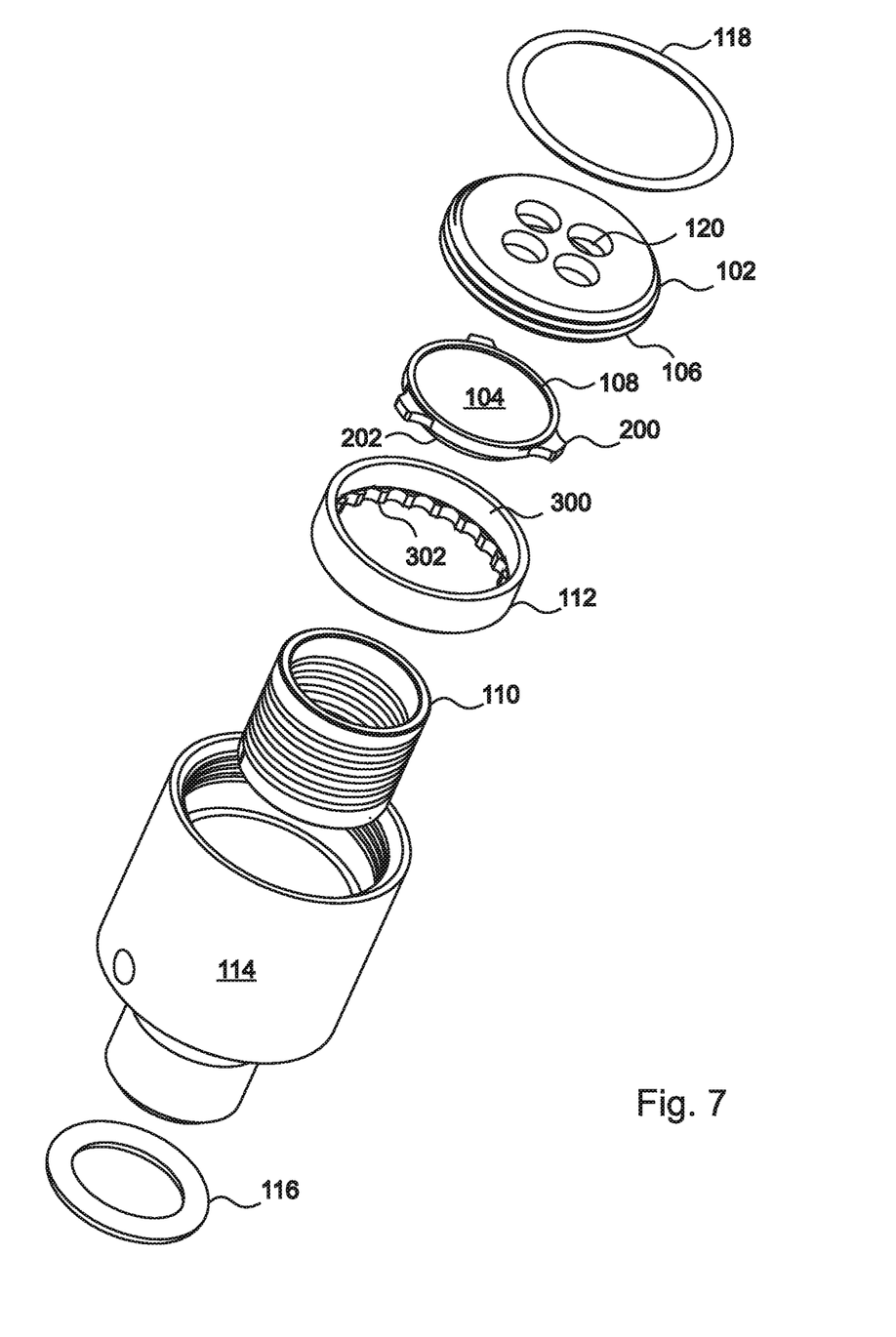
FIG. 7 is an exploded perspective view of the embodiment of FIG. 1A.

FIG. 7 is an exploded view of the illustrated embodiment.

In embodiments, the seal plate 102 and poppet 104, including their respective sealing surfaces 106, 108, as well as the surrounding structures 112, 114 are all made of one or more metals, such as alloys of stainless steel, and in some embodiments the metals have matched coefficients of thermal expansion (CTE-matched) so that the mechanical operation of the valve, including the sliding of the poppet 104 within the spacer 112, is not impeded by temperature changes in the environment.

In the illustrated embodiment, the poppet 104 is made from a hardened stainless steel such as Nitronic 60 alloy (Cr 17%, Mn 8%, Ni 8.5%, Si 4%, N 0.13%, C 0.10%, Fe balance) that resists galling, abrasion, and other forms of wear, and the surrounding spacer 112 and other structures 114, 102, are also made from stainless steel alloys, so that the poppet 104 and surrounding structures 112, 114, 102, are CTE matched. In similar embodiments, the cylinder or spacer 112 is made from a hardened material such as Nitronic 60, and in still other embodiments both the poppet 104 and the spacer 112, and/or other surrounding structures 102, 114, are made from hardened steel alloys such as Nitronic 60.

The illustrated embodiment is suitable for low-pressure gas applications because there is very little internal sliding friction between the poppet 104 and the spacer 112. Embodiments such as the one illustrated can therefore be implemented in missiles for precise pressure relief of internal volumes under low pressure flight conditions, as well as for providing seals against contamination from external ambient atmosphere during non-flight conditions.

Figure 8:
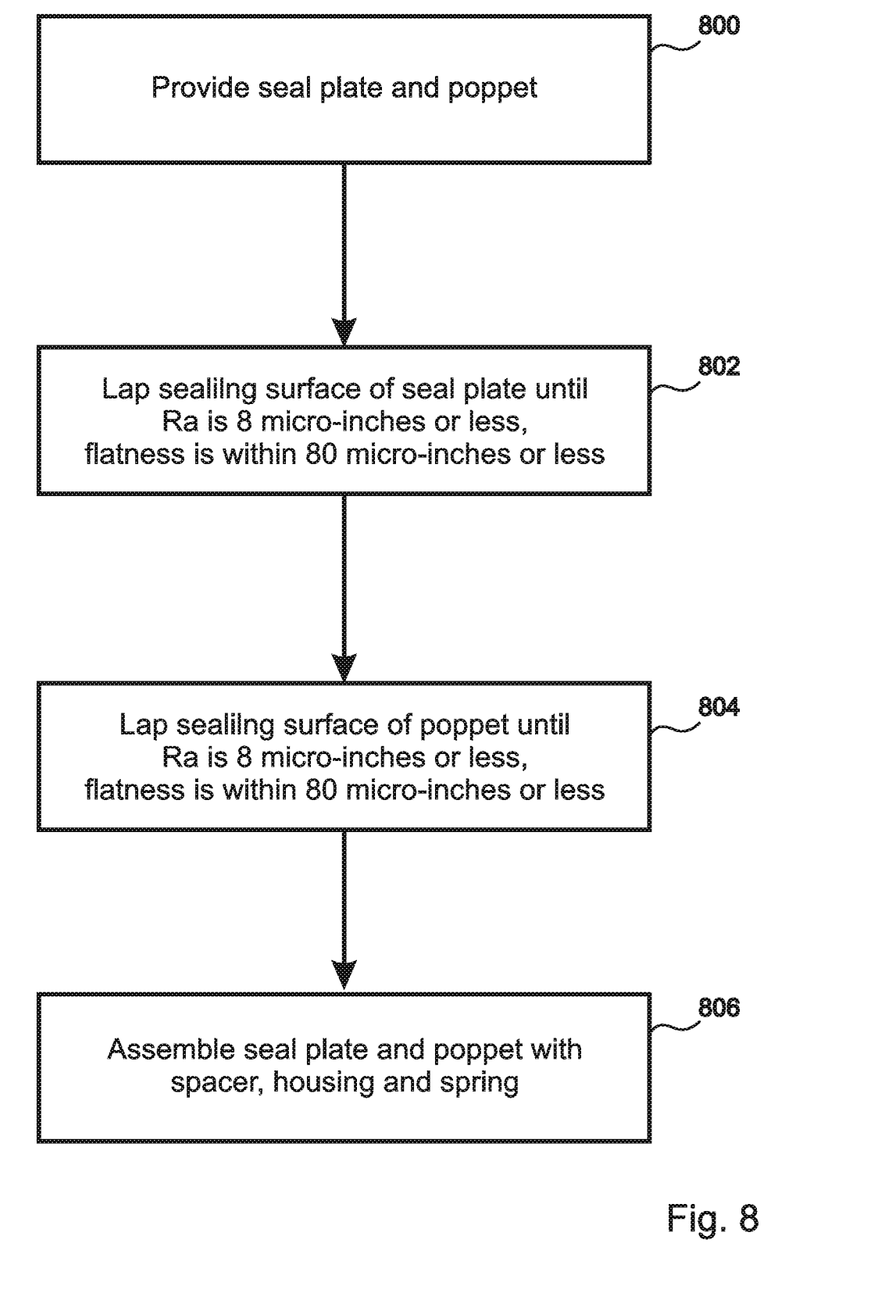
FIG. 8 is a flow diagram of a method embodiment of the present disclosure.

FIG. 8 is a flow diagram that illustrates a method embodiment of the present disclosure. According to the embodiment, a seal plate and poppet are provided 800. The sealing surface of the seal plate is lapped 802 until it is smooth (in embodiments Ra=8 micro-inches or less) and flat (in embodiments the flatness is within 80 micro-inches). Similarly, the sealing surface of the poppet is lapped 804 until it is smooth (in embodiments Ra=8 micro-inches or less) and flat (in embodiments the flatness is within 80 micro-inches). In some embodiments, both sealing surfaces are lapped or otherwise shaped until the Ra is 4 micro-inches or less, and the flatness is within 40 micro-inches. Finally, the seal plate and poppet are assembled 806 within the housing together with the spring and the spacer. In various embodiments, lapping, diamond turning, and/or polishing is used to smooth and flatten the sealing surfaces.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A pressure relief valve, comprising:
   a fluid inlet and a fluid outlet;
   a fixed sealing surface, the fixed sealing surface being fixed in position within a housing; and
   a mobile member having a mobile sealing surface positioned in opposition to the fixed sealing surface, the mobile member being axially movable away from and toward the fixed sealing surface so as to alternately separate the sealing surfaces from each other and bring the sealing surfaces into mutual contact with each other;
   wherein the mobile member is a poppet that is maintained in axial alignment with the fixed sealing surface by a spacer;
   wherein the spacer includes a flange having internal scalloped edges that establish and limit a maximum disance of separation between the sealing surfaces;
   wherein the pressure relief valve is closed and prevents passage of a fluid from the fluid inlet to the fluid outlet when the fixed sealing surface and the mobile sealing surface are in direct contact with each other without use of an elastomer therebetween, and the pressure relief valve is open and permits passage of the fluid from the fluid inlet to the fluid outlet when the fixed sealing surface and the mobile sealing surface are separated from each other; and
   the pressure relief valve being configured to open when a pressure at the fluid inlet is higher than a pressure at the fluid outlet by more than a specified cracking pressure.

2. The pressure relief valve of claim 1, wherein each of the sealing surfaces has a roughness Ra that is not greater than 8 micro-inches, and a flatness that is within 80 micro-inches.

3. The pressure relief valve of claim 1, wherein each of the sealing surfaces has a roughness Ra that is not greater than 4 micro-inches, and a flatness that is within 40 micro-inches.

4. The pressure relief valve of claim 1, wherein the mobile sealing surface is an annular surface that symmetrically surrounds a central axis of the poppet.

5. The pressure relief valve of claim 1, wherein the poppet comprises a plurality of arms that extend radially, the arms having distal surfaces that slide along an inner surface of the spacer when the mobile member moves toward and away from the fixed member, whereby the fluid is able to flow between the arms when the pressure relief valve is open.

6. The pressure relief valve of claim 5, wherein the distal surfaces of the arms have axial edges that are squared in shape.

7. The pressure relief valve of claim 5, wherein the distal surfaces of the arms have axial edges that are curved in shape.

8. The pressure relief valve of claim 5, wherein the distal surfaces of the arms are shaped as sections of a sphere.

9. The pressure relief valve of claim 1, wherein an inner diameter of the flange is variable about a circumference of the flange, thereby reducing obstruction of fluid flow by the flange when the pressure relief valve is open.

10. The pressure relief valve of claim 1, further comprising a spring configured to apply an axial force to the mobile member that brings the sealing surfaces into mutual contact with each other, a tension of the spring thereby determining the cracking pressure.

11. The pressure relief valve of claim 10, wherein the spring is a coil spring that is configured to apply a force to the poppet that is symmetrically proximal to a perimeter of the poppet.

12. The pressure relief valve of claim 1, wherein the fixed sealing surface is formed on a seal plate.

13. The pressure relief valve of claim 12, wherein the seal plate is in threaded attachment to the housing, and wherein the mobile member is maintained within the housing by the seal plate.

14. The pressure relief valve of claim 13, wherein threads of the threaded attachment are sealed by a thread sealant.

15. The pressure relief valve of claim 12, wherein the seal plate, the mobile member, and the housing all have matched thermal coefficients of expansion.

16. The pressure relief valve of claim 12, wherein the seal plate, the mobile member, and the housing are all made from metal.

17. The pressure relief valve of claim 12, wherein the seal plate, the mobile member, and the housing are all made from stainless steel.

18. The pressure relief valve of claim 1, wherein each of the sealing surfaces has a high degree of smoothness and flatness, thereby allowing for relatively frictionless movement.

19. The pressure relief valve of claim 17, wherein the mobile member is made from an alloy comprising 17% chromium, 8% manganese, 8.5% nickel, 4% sulfur, 0.13% nitrogen, 0.1% carbon, and iron.

20. A method of manufacturing a pressure relief valve that forms a seal by mutual contact between rigid sealing surfaces, the method comprising:
providing a seal plate having a fixed sealing surface and a mobile member having a mobile sealing surface;
smoothing and flattening each of the sealing surfaces; and
assembling the seal plate and mobile member into a housing such that:
the mobile sealing surface is positioned in opposition to the fixed sealing surface, the mobile member being axially movable away from and toward the seal plate so as to alternately separate the sealing surfaces from each other and bring the sealing surfaces into direct contact with each other without use of an elastomer therebetween wherein the mobile member is a poppet that is maintained in axial alignment with the fixed sealing surface by a spacer having a flange with internal scalloped edges that establish and limit a maximum distance of separation between the sealing surfaces;
the pressure relief valve is closed and prevents passage of a fluid from an inlet to an outlet when the sealing surfaces are in direct contact with each other without use of an elastomer therebetween, and the pressure relief valve is open and permits passage of the fluid from the inlet to the outlet when the sealing surfaces are separated from each other; and
the pressure relief valve is configured to open when a pressure at the inlet is higher than a pressure at the outlet by more than a specified cracking pressure.

21. The method of claim 20, wherein smoothing and flattening each of the sealing surfaces includes smoothing and flattening each of the sealing surfaces until each of the sealing surfaces has a roughness Ra that is not greater than 8 micro-inches and a flatness that is within 80 micro-inches.

22. The method of claim 20, wherein smoothing and flattening each of the sealing surfaces includes smoothing and flattening each of the sealing surfaces until each of the sealing surfaces has a roughness Ra that is not greater than 4 micro-inches and a flatness that is within 40 micro-inches.

23. The method of claim 20, wherein smoothing and flattening each of the sealing surfaces includes lapping each of the sealing surfaces.

24. A pressure relief valve, comprising:
a fluid inlet and a fluid outlet;
a seal plate having a seal plate sealing surface, the seal plate being fixed in position within a housing; and
a poppet having a mobile sealing surface positioned in opposition to the seal plate sealing surface, the poppet being axially movable away from and toward the seal plate so as to alternately separate the sealing surfaces from each other and bring the sealing surfaces into mutual contact with each other;
wherein the mobile member is a poppet that is maintained in axial alignment with the fixed sealing surface by a spacer;
wherein the spacer includes a flange having scalloped edges that establish and limit a maximum of distance separation between the sealing surfaces;
wherein the pressure relief valve is closed and prevents passage of a fluid from the fluid inlet to the fluid outlet when the poppet and seal plate sealing surfaces are in direct contact with each other without use of an elastomer therebetween, and the pressure relief valve is open and permits passage of the fluid from the fluid inlet to the fluid outlet when the sealing surfaces are separated from each other;
the pressure relief valve being configured to open when a pressure at the fluid inlet is higher than a pressure at the fluid outlet by more than a specified cracking pressure;
wherein the poppet, seal plate, and the housing are all made from metal; and wherein the poppet includes a plurality of tabs that extend radially and slide along an inner surface of a surrounding surface so as to maintain the sealing surfaces in axial alignment with each other when the poppet moves toward and away from the seal plate, whereby the fluid is able to flow between the tabs when the pressure relief valve is open.

25. The pressure relief valve of claim 24, wherein each of the sealing surfaces has a high degree of smoothness and flatness, thereby allowing for relatively frictionless movement.

\* \* \* \* \*